United States Patent Office 3,669,677
Patented June 13, 1972

3,669,677
METHOD OF MAKING PROTEINACEOUS SOY COMPOSITION HAVING REDUCED MICRO-ORGANISM COUNT
Louis Sair, Evergreen Park, and Irving Melcer, Park Forest, Ill., assignors to The Griffith Laboratories, Inc., Chicago, Ill.
No Drawing. Continuation-in-part of application Ser. No. 631,596, Apr. 18, 1967. This application Feb. 18, 1970, Ser. No. 12,461
Int. Cl. A23j 1/14
U.S. Cl. 99—17          8 Claims

ABSTRACT OF THE DISCLOSURE

A method for producing a soy concentrate which has reduced bacterial activity wherein (1) defatted soy bean material is extracted with a liquid extracting medium at the isoelectric pH, (2) the liquid extract having an undesired soluble beany flavor-conferring material is removed and insoluble soy protein material is recovered, (3) subjecting this insoluble material to bactericidal heating at at least about 160° F. at a acid pH or pH in the vicinity of the isoelectric pH to reduce the bacterial activity, (4) raising the pH of the heated soy protein material to 6 to 10.5, and (5) drying the material.

---

This application is a continuation-in-part of our pending application Ser. No. 631,596, filed Apr. 18, 1967, now abandoned.

The present invention relates to edible, palatable proteinaceous soybean products having a reduced or diminished micro-organism count which are particularly useful in food products, including meat products, and methods of preparing such compositions wherein the bacterial level is controlled.

More specifically, this invention has particular reference to an improvement in methods of conversion of soybean protein material such as defatted or deoiled soybean material, including defatted soybean flour and defatted soybean flakes, into glycinin-based soy protein compositions useful in the preparation of food products, including fresh and cured whole meat and comminuted meat products, wherein the improvement resides in a method of limiting or controlling bacteria present in soybean protein concentrate. Further, this invention concerns a soy protein concentrate having a desirable viscosity, as well as reduced bacterial activity.

The bacterial count of soybean flour or flakes used in our process can be as high as, for example, 500,000/grams and the thermophile count, for example, can be as high as 75,000/gram.

The bacteriological content of materials used in the preparation of food products for human use is of great importance and the specific bacteriological requirements are dependent upon the specific application. If the soybean protein product is to be used in food products requiring high heat during the manufacture of such products, such heating can, to a certain extent, destroy bacteria, including thermophiles, mesophiles, yeast, and molds. The various food applications for soybean protein concentrates indicate that it is desirable for the protein concentrates to have a low bacterial count, particularly (e.g., canned food products) a low thermophile (includes "flat sour" micro-organisms) count.

Protein materials such as soybeam flour or flakes provide one of the cheapest and best sources of essential protein, and have been used in a somewhat limited manner, for example, in the preparation of coarsely ground and finely emulsified meat products as a fat emulsifier and water binding agent.

One of the greatest obstacles to the general use in this country of soy protein materials as a direct source of human food products, is the characteristic, undesired taste or flavor which is evidenced, for example, in soybean flour or meal by a bitter or beany taste associated therewith. A great amount of research has been conducted to try to eliminate this undesired characteristic, and many approaches have been used with varying degrees of success.

One approach, as shown in U.S. Pat. 2,881,076, involves the adjustment of the pH of soybean material to the vicinity of the isoelectric pH, followed by extensive washing with water to remove retained beany taste or flavor conferring constituents and to provide an outstanding, soy protein concentrate having a minimal level of undesired beany taste or flavor, odor and color.

More specifically, U.S. Pat. 2,881,076 describes a process for preparing and recovering an improved, soy protein concentrate which requires that soybean material, for example, in the form of deoiled or defatted flour or flakes, be subjected to the dissolving action of water having a pH in the vicinity of the isoelectric pH of the protein or glycinin content of the soybean material (about 4–4.8), and that the insoluble solids in the form of an essentially insoluble slurry be separated from the resulting solution. The insoluble solids are then washed. The purpose of these steps is to remove undesired, characteristic beany taste or flavor, odor and color conferring material. A preferred embodiment involves raising or adjusting the pH of the insoluble, soy protein material by adding an edible, alkaline agent to the insoluble protein slurry. The resulting soy protein concentrate, in the form of a slurry, is then dried (e.g., spray dried).

By utilizing the process of U.S. Pat. 2,881,076, the soluble sugar and material soluble in the vicinity of the isoelectric pH, and undesired characteristic beany taste or flavor, odor and color conferring material is removed, which results in a soy protein concentrate product having a protein content, on a dry basis, of about 70% by weight or higher. Such a protein concentrate has a bland and debittered taste, light color, and when suspended in water, develops viscous dispersions having good emulsifying and water-binding properties.

Such soy protein concentrates have good solubility and minimized denatured protein characteristics as evidenced, for example, by a high protein content (e.g., about 70–73% by weight on a dry basis), a high nitrogen solubility index (NSI) (e.g., at least 15% by weight and, preferably, at least about 40% by weight); have good emulsifying and water binding characteristics; and have been substantially freed of undesired, characteristic taste or flavor conferring material (e.g., debittered or rendered bland).

Soy protein concentrates made from defatted or deoiled soybean flour in accordance with U.S. Pat. 2,881,076 are particularly well suited for use in finely comminuted meat emulsions such as frankfurters, sausage products and luncheon meats. Furthermore, these soy protein concentrates also can be used, if desired, in cereals, gravies, sauces, soups, baked goods and bland delicate desserts and milk products.

We have found that the application of heat to effect bacterial control of the soy protein material can be utilized effectively only after the extraction and removal of soluble material at a lowered acid pH or in the vicinity of the isoelectric pH and before any neutralization step which involves adjusting or raising the pH of the soy protein material or drying step.

By the bactericidal heating of the extracted soy protein material, we have discovered one could effectively combat and destroy bacterial flora and at the same time advantageously increase the viscosity after neutralization of the soy protein material without substantially altering its color after neutralization and without necessarily requiring denaturation of the protein material substantially as evidenced by a decrease of its nitrogen solubility index (NSI) to below about 15% by weight. It was unobvious that such beneficial results could or would be obtained, particularly by heating the insoluble protein material at that stage of the process.

The treatment in the vicinity of the isoelectric pH is only somewhat bactericidal (e.g., particularly with the use of sodium bisulfite) and can destroy, for example, about 50% of the initial count (particularly the mesophile count). However, the remaining portion of the process has a distinct tendency to increase the bacterial growth of the thermophile micro-organisms (heat loving), and upon adjusting or increasing the pH (neutralization) of the insoluble soy protein slurry after the extraction step, the soy protein concentrate becomes very viscous and thereby protects bacterial life. By using good or usual commercial practices, for example, it has been found that edible soybean protein products produced by the extraction step may have, for example, a total bacterial count of up to about 100,000/gram and thermophile count as high as 75,000/gram.

The extraction of the soy protein material at a reduced pH (e.g., in the vicinity of the isoelectric pH) should be conducted without the application of heat, otherwise one must keep the soy protein material in a heated bactericidal state throughout the process in order to maintain inhibition of bacterial growth. Furthermore, by heating the soy protein material at this stage, one tends to peptize (solubilizes the protein so that it tends to form a colloidal dispersion or emulsion) the soy protein material so that it tends to be lost with the soluble extract which is discarded.

The later step involving adjusting or increasing the pH with alkaline material should not be conducted with the application of heat. The application of mild heat and time such as used during pasteurization (about 140°-160° F. for about 30 minutes) increases the viscosity of the soy protein material and thereby tends to protect bacterial life, and encourages the undesired growth of thermophiles, although it tends to destroy mesophiles. The use of more severe heating conditions (about 180° F.-212° F.) which tend to destroy bacterial activity also tend to discolor and denature the soy protein material.

The present invention overcomes the deficiencies of the prior processes and procedures and is based on the discovery that by subjecting the insoluble extracted soy protein material to bactericidal heating, after the undesired soluble beany taste conferring material has been removed but while the pH is at a reduced level or in the vicinity of the isoelectric pH, one reduces bacterial activity and maintains or even enhances the viscosity characteristics of the soy protein material as a result of raising its pH (neutralization) without causing a substantial alteration of its color.

Our new and improved process provides excellent control of bacteria and produces improved, edible soybean protein products by raising the temperature of a slurry of extracted soy protein material up to at least about 160° F., preferably about 180-212° F. or 190-212° F., and maintaining the slurry at such temperatures for an effective period of time prior to adjusting or raising (neutralizing) the pH of the protein material in the range of about 6 to 10.5. By pinpointing the destruction of bacteria at this stage of processing, a soybean protein product can be produced having a thermophile count of less than 500/gram, or even less than 300/gram, and a total bacterial count of less than 50,000/gram, or even less than 25,000/gram.

By going to a higher temperature for the bactericidal heating step, such as about 175° F. or somewhat higher, the apparent result is to extract the protein material enclosed in the insoluble gum cell network. Upon neutralization to a pH of about 6 to 10.5, the extracted protein becomes available and the neutralized slurry has a higher viscosity. More importantly, a very viscous soy protein product is obtained on cooling. The cold (about room temperature) viscosity is an index of the ability of the protein to hold water and the more viscous the cold paste, the more desirable it is from the standpoint of emulsification and water retention.

By raising the temperature of the bactericidal heating step up to about 190° F., this effect is even more pronounced. The slurry of extracted soy protein material, heated to about 190° F., followed by neutralization and cooling, gives a paste with a high cold viscosity and with no flowability. By way of comparison, an unheated slurry, when neutralized, produces a paste which is almost fluid.

It is important that the soy protein material used in the practice of this invention be extracted of soluble materials by being subjected to the dissolving action of water at a pH in the vicinity of the isoelectric pH of the protein or glycinin content of the soybean protein material, and that the resulting solution be separated from the insoluble solids, followed by the washing of the insoluble solids in order to remove soluble beany taste conferring material. This process does not remove the desired protein material, but rather extracts the undesirable soluble material from the protein. The resulting extract is discarded. Only after extraction should be proteinaceous slurry, having a pH of not more than about 4.8, be heated to at least about 160° F., preferably higher, for times ranging between about 10 minutes and 2 hours, in order to diminish or control the bacteria concentration without producing the undesired side effects mentioned above.

Referring to our methods more specifically, first, soy protein material (having a nitrogen solubility index (NSI) of more than 15% by weight, preferably, more than about 40% by weight) which, preferably, has been defatted or deoiled, including defatted or deoiled soybean flour or flakes, for example, is made up into an aqueous slurry (e.g., about 5-20% by weight solids) in which the pH of the soy protein material is adjusted or lowered at about room temperature to approximately the isoelectric pH of its protein content (sometimes referred to as "isoelectric extraction" treatment).

Generally, the adjusted pH for soybean protein is about 4.2, but the adjusted pH may be in the range, for example, of approximately 4 through 4.8 for such materials. Many edible, acidic materials (e.g., acetic acid, hydrochloric acid, sulfuric acid, sulfurous acid and phosphoric acid), either organic or inorganic, may be used to achieve a pH in the vicinity of the isoelectric pH. The combination of hydrochloric acid and sodium bisulfite is a preferred reagent.

The duration of the isoelectric extraction is dependent upon the particular process conditions used, but generally from about 10 minutes to 10 hours or more will suffice.

When this extraction treatment has been concluded, the resulting liquid extract, having soluble material including the undesired, characteristic taste or flavor (e.g., bitter, beany, nut-like or chalky taste or flavor), and odor or color conferring material found in the original soybean protein material from which the protein concentrate is made, is separated and discarded by a centrifuging, screening or filtering operation from the insoluble, soy protein solids. The recovered insoluble soy protein material may be further extracted by being washed, as desired, with water, followed by separation (e.g., filtered, screened or centrifuged) from the extract.

The amount of wash water used may vary over wide limits. Actually, the total wash water may vary from a weight equal to the weight of the soybean material up to about 25 times the weight of the soybean material and may consist of one or more washings. Optionally, the wash water may be acidified to a pH approximating the isoelectric pH of the soybean material, but generally this is not necessary where a relatively small amount of wash water is required or used.

The extraction treatment is carried out generally by washing the soy protein material with unheated water (water having temperatures of from about 55° F. to about 100° F.), although higher or lower temperatures can be used under some circumstances. The duration of the washing step is dependent upon the particular process conditions used, but generally from about ½ hour to 10 hours or more will suffice. The resulting insoluble soy protein slurry has a pH in the vicinity of the isoelectric pH, and has, for example, about 65–75% by weight protein determined on a dry basis and about 60–80% by weight water.

The bactericidal heating step is performed by treating an aqueous slurry of the extracted soy protein material. In commercial operations it is preferable to produce a pumpable slurry, but with as high solids as possible in order to facilitate handling and drying. It has been found, for example, that a slurry having about 18–20% by weight solids gives satisfactory results.

The slurry of insoluble soy protein material is then heated to a temperature of at least 160° F. (e.g., about 180–212° F., preferably about 190–212° F.) for a period of time sufficient to combat or destroy substantially the required quantity of viable micro-organisms. The time may range from a few seconds to several hours, but generally will be, for example, about 10–45 minutes, depending on the temperature used in the bactericidal heating step. It has been found that there is a reciprocal relationship between the time or duration of bactericidal heating and the temperature; that is, the duration of the bactericidal heating required at 200° F., is much less than the duration required at about 160° F.

If one wishes to eliminate the preferred "neutralization" step by which the pH of the soy protein material is adjusted or raised, the heated soy protein material should be promptly dried (e.g., spray dried) in a rapid manner to the desired moisture content. However, it is preferable to adjust or raise the pH of the heated soy protein concentrate promptly and then promptly subject the hot soy protein concentrate to rapid drying.

The pH is adjusted or raised (neutralized) by adding an edible, inorganic alkali or inorganic buffering agent (e.g., sodium carbonate, sodium bicarbonate, sodium hydroxide, disodium phosphate, trisodium phosphate, sodium tripolyphosphate, tetrasodium pyrophosphate, the analogous potassium phosphates, and ammonium hydroxide) or admixtures thereof to the heat-treated insoluble soy protein material in the presence of water and with mixing so as to raise or adjust (sometimes herein referred to by terms such as "neutralizing," "neutralization," "neutralize" or "neutralized") the pH of the soy protein material to within the range of about 6 to about 10.5.

The preferred neutralization step raises the pH, thus rendering the soy protein concentrate more soluble and more viscous, thereby enhancing the water binding and emulsifying characteristics of the soy protein material, which characteristics are important when the concentrate is used in meat and other food products.

Immediately following neutralization of the soy protein material, the neutralized, soluble, soy protein concentrate is dried (e.g., flash or spray dried) quickly to the desired moisture content (e.g., below about 10% by weight). We have discovered that when this post-neutralization drying step, as well as the bactericidal heating step, is conducted under sufficiently controlled conditions, the resulting essentially dry, neutralized, soluble, soy protein concentrate has a nitrogen solubility index (NSI) of at least 15% by weight, and, preferably, at least about 40% by weight.

In order to obtain a neutralized soy protein concentrate having an extremely low bacterial count, it is important that the neutralization and drying steps immediately follow the bacterial control heating step. Further, it is highly desirable that the hot slurry which is the product of the bacterial control heating stage be neutralized while still hot and fed directly (also while still hot) into the drier. The rapid neutralization and drying without any purposeful cooling in between does not give any remaining viable micro-organisms time to multiply before drying, at which time their rate of growth is greatly retarded.

In commercial processing, it has been found to be desirable to move the soybean material from the isoelectric heating step continuously to the neutralization step, promptly followed by spray drying within a period of not greater than one hour, preferably within ten minutes or less.

The nitrogen solubility index (NSI) values expressed herein were based on the following general test procedure.

A 10-gm. aliquot of the sample to be tested is added to a Waring Blendor cup having 200 ml. of distilled water, and the slurry is blended for 3 minutes at high speed.

The blended slurry is transferred quantitatively to a 400 ml. beaker, using small rinses when needed. The pH of the transferred slurry is adjusted, if necessary, to a pH of 6.7–6.9 with 1 N NaOH or 1 N HCl. The suspension is then stirred for 15 minutes at slow speed with care so as to avoid creating a vortex action or stirring-in air. The slurry is diluted to 500 ml. with distilled water.

A 250 ml. aliquot is centrifuged, using a 250 ml. cup, for 10 minutes at 2,500 r.p.m. (1600×g).

A 50.0 ml. aliquot of clear or translucent supernatant free of suspended particles (if necessary, filter) is transferred to a Kjeldahl flask and the nitrogen content is determined by the Kjeldahl method. (A smaller aliquot may be used if the soluble nitrogen content is unusually high.)

The percent by weight of soluble nitrogen of the sample is calculated based on $\frac{1}{10}$ of the weight of the material initially used, as follows:

$$\text{NSI} = \frac{\text{Soluble nitrogen}}{\text{Total nitrogen}} \times 100\%$$

The following examples are for purposes of illustration only, and our invention is not necessarily limited thereto.

EXAMPLE 1

A soy protein slurry was prepared with about 100 parts by weight of deoiled or defatted soy flour and about 835 parts by weight of water. The slurry was held at about 55° F. and one part by weight of sodium bisulfite was added and the pH was adjusted to about 4.2 using diluted hydrochloric acid (1:1). This formed a slurry having about 11% by weight solids. The micro-organism count for the various steps indicated in Table 1 below was determined by the method set forth in "Recommended Methods for the Microbiological Examination of Food," Second edition, edited by J. M. Shaif, chapter VI, pages 55–64, published by the American Public Health Association, 1966.

Table 1 below shows that the treatment with acid and sodium bisulfite, as described above, caused about a 68% drop in the mesophile count and about a 20% drop in the thermophile count.

TABLE 1

| Time of count | Mesophiles/ ml. of slurry | Thermophiles/ml. of slurry |
| --- | --- | --- |
| After bisulfite addition but before acid addition | 50,000 | 16,000 |
| After acid addition | 23,000 | 12,000 |
| One hour after bisulfite and acid treatment | 18,000 | 13,000 |

A portion of the original about 11% by weight slurry was agitated for about 30 minutes and then permitted to settle for 6 hours. The supernatant liquid was decanted, thereby leaving an insoluble soy protein slurry which was then washed with a three-fold volume of water. The wash water was discarded and the insoluble protein material was again suspended in water to produce a slurry having about 14% by weight solids. This slurry was divided into 2 parts, 1 of which parts was heated in the acid condition (a pH of about 4.2) at about 160° F. for about 1 hour. The pH of the second part was raised to a pH of about 6.5 using an aqueous solution of sodium hydroxide (the term "sodium hydroxide" as used herein includes commercial sodium hydroxide such as commercial caustic soda) and was heated at about 160° F. for about 1 hour. Using the same bacteria assay procedure referred to above, the results shown in Table 2 below were obtained.

TABLE 2

| Duration of heating at 160° F., min. | Heating of extracted protein material | | Heating of neutralized protein material | |
|---|---|---|---|---|
| | Mesophiles/ml. of slurry | Thelmophiles/ml. of slurry | Mesophiles/ml. of slurry | Thermophiles/ml. of slurry |
| 0 [1] | 24,000 | 20,000 | 48,000 | 24,000 |
| 15 | 27,000 | 22,000 | 38,000 | 22,000 |
| 30 | 23,000 | 15,000 | 32,000 | 21,000 |
| 60 | 19,000 | 10,000 | 31,000 | 19,000 |

[1] The "0" time was the point at which 160° F. was reached.

Table 2 above shows that a one hour heat treatment of the soy protein material obtained after extraction killed about 50% of the thermophiles; whereas a similar heat treatment after neutralization to a pH of about 6.5, killed only about 21% of the thermophiles.

EXAMPLE 2

Using the procedure outlined above in Example 1, the bisulfite addition, acid addition, and washing steps were repeated. The recovered slurry having about 14% by weight solids was then heated to about 180° F. Approximately 15 minutes were required to raise the slurry temperature from ambient temperature (about 55° F.) to about 180° F. Table 3 below shows the bacterial count, as determined by the procedure referred to above, after maintaining the about 180° F. temperature for the periods of time indicated therein.

TABLE 3

| Duration of heating of extracted protein at 180° F., min. | Mesophiles/ ml. of slurry | Thermophiles/ml. of slurry |
|---|---|---|
| 0 [1] | 22,000 | 61,000 |
| 15 | 890 | 900 |
| 30 | 190 | 60 |
| 60 | <10 | 30 |

[1] Point at which 180° F. was reached.

EXAMPLE 3

Using the procedure described in Examples 1 and 2, a soy protein slurry was formed and treated with bisulfite and acid, followed by washing. The recovered slurry having about 14% by weight solids was then heated until a temperature of about 200° F. was reached. Table 4 below shows the bacterial count, as determined by the procedure referred to above, after maintaining the about 200° F. temperature for the intervals indicated therein.

TABLE 4

| Duration of heating of extracted protein at 200 F., min. | Mesophiles/ ml. of slurry | Thermophiles/ml. of slurry |
|---|---|---|
| 0 [1] | 150 | 70 |
| 15 | <10 | <10 |
| 30 | <10 | <10 |
| 60 | <10 | <10 |

[1] Point at which 200° F. was reached.

EXAMPLE 4

An aqueous slurry having about 19% by weight solids was formed of deoiled or defatted soybean flour. Hydrochloric acid was added to the slurry to adjust the pH to about 4.17. The acid-treated slurry was agitated and permitted to soak for about ¾ hour. The slurry was then filtered and washed with about ⅓ of the original volume of water. The recovered insoluble protein material was resuspended with water to provide a slurry having about 18.6% by weight solids. The pH of the slurry remained at about 4.17. The viscosity of the unheated slurry was determined as shown in Table 5 below. The slurry was divided into 3 samples, which samples were heat-treated as indicated in Table 5 for about 30 minutes. Table 5 indicates the change in viscosity which occurred at the various heating temperatures. The viscosity of the samples was determined, as shown in Table 5, using a Brookfield viscosimeter, No. 3 spindle at 12 r.p.m.

TABLE 5

| Temperature of heating extracted protein samples for 30 minutes | Viscosity of extracted protein |
|---|---|
| Unheated | 600 |
| 150° F. | 600 |
| 170° F. | 700 |
| 190° F. | 2,650 |

EXAMPLE 5

Following the procedure set forth in Example 4, an aqueous slurry of soy protein material was formed, and the slurry was treated with acid and then washed. The recovered insoluble protein material was then resuspended as a slurry having about 18.6% by weight solids, and separate samples of the slurry were heat-treated at the temperatures shown in Table 6 below for about 30 minutes, and one sample was not heat-treated. Sufficient sodium hydroxide, as a 50% solution, was then added to all of the samples of soy protein concentrate to raise the pH to about 6.5. The viscosity (centipoises) determinations of the neutralized soy protein material shown in Table 6 were measured with a Brookfield viscosimeter, No. 4 spindle at 6 r.p.m.

TABLE 6

| Temperature of heating extracted protein before neutralization | Viscosity of neutralized protein |
|---|---|
| Unheated | 7,500 |
| 150° F. | 20,000 |
| 170° F. | 33,000 |
| 190° F. | 70,000 |

The forms of the invention herein shown and described are to be considered only as illustrative. It will be apparent to those skilled in the art that modifications may be made therein without departure from the spirit of the invention or the scope of the appended claims.

We claim:

1. A method for producing and recovering an essentially dry, uniformly palatable, soy protein product which is substantially free of beany flavor, has reduced bacterial activity, and which is suitable for use in food products for humans, which comprises:
   extracting soybean material with a liquid extracting medium at a pH in the vicinity of the isoelectric pH of the protein content of said material, substantially removing the liquid extract having undesired soluble beany flavor-conferring material, and recovering the resulting insoluble soy protein material;
   combatting the bacterial activity of the insoluble soy protein material by subjecting said material to bactericidal heating at at least about 160° F. at an acid pH or pH in the vicinity of the isoelectric pH;
   raising the pH of the heated soy protein material to about 6 to 10.5; and,
   drying the resulting soy protein material to produce said essentially dry soy protein product having a thermophile activity of less than 500 per gram.

2. The method of claim 1 wherein said soybean material which is subjected to extracting is in the form of defatted soy protein flour.

3. The method of claim 1 wherein said bactericidal heating is conducted at a temperature of at least about 190° F.

4. The method of claim 1 wherein said extracting includes washing and recovering insoluble soy protein material from said treatment in the vicinity of the protein content of the soybean material.

5. A method for producing and recovering an essentially dry, uniformly palatable, soy protein concentrate which is substantially free of beany flavor, has reduced bacterial activity, has good solubility characteristics and which is suitable for use in food products for humans, which comprises:
   extracting soybean material with a liquid extracting medium at a pH in the vicinity of the isoelectric pH of the protein content of said material, substantially removing the liquid extract having undesired soluble beany flavor-conferring material, and washing and recovering insoluble soy protein material;
   combatting the bacterial activity of a slurry of the recovered soy protein material by subjecting said slurry to bactericidal heating at at least about 180° F. at a pH below about 4.8 so that the thermophile activity is less than 300 per gram of soy protein material;
   raising the pH of the heated soy protein material to about 6 to 10.5 while it is hot; and,
   drying the resulting hot soy protein concentrate to produce said essentially dry soy protein concentrate having a thermophile activity of less than 300 per gram of soy protein concentrate.

6. The method of claim 5 wherein said soybean material which is subjected to extracting is in the form of defatted soy protein flour.

7. A method for producing and recovering an essentially dry, uniformly palatable, soy protein concentrate of reduced bacterial activity which is substantially free of beany taste, has bacterial activity of less than 25,000 per gram, has thermophile activity of less than 300 per gram, has good solubility and water binding characteristics and which is suitable for use in food products for humans, which comprises:
   extracting soybean material with a liquid extracting medium at a pH in the vicinity of the isoelectric pH of the protein content of said material, substantially removing the liquid extract having undesired soluble beany flavor conferring material, and washing and recovering insoluble soy protein material;
   combatting the bacterial activity of a slurry of the recovered soy protein material by subjecting said slurry to bactericidal heating at at least about 180° F. at a pH of below about 4.8 to reduce the bacterial activity to less than 25,000 per gram and thermophile activity to less than 300 per gram;
   rapidly raising the pH of the heated soy protein material to about 6 to 10.5 while it is still hot; and,
   drying the resulting soy protein concentrate rapidly while it is still hot to produce said essentially dry soy protein concentrate having at least about 70% by weight protein, a nitrogen solubility index of at least about 15% by weight, bacterial activity of less than 25,000 per gram, and thermophile activity of less than 300 per gram.

8. The method of claim 7 wherein said soybean material which is subjected to extracting is in the form of defatted soy protein flour.

References Cited

UNITED STATES PATENTS 2,881,076    4/1959    Sair _____ 99—14

A. LOUIS MONACELL, Primary Examiner

W. A. SIMONS, Assistant Examiner